United States Patent [19]

Malloy et al.

[11] 4,318,820

[45] Mar. 9, 1982

[54] CHIRAL SUPPORTS FOR RESOLUTION OF RACEMATES

[75] Inventors: Thomas P. Malloy, Lake Zurich; Michael D. Tufano, Broadview, both of Ill.

[73] Assignee: UOP Inc., Des Plaines, Ill.

[21] Appl. No.: 124,395

[22] Filed: Feb. 25, 1980

[51] Int. Cl.³ .............................................. B01D 15/08
[52] U.S. Cl. .................................... 252/184; 210/635; 210/659; 252/430; 428/407; 428/451; 428/702
[58] Field of Search ................... 252/184, 430, 455 R, 252/463; 210/635, 656, 659; 428/404, 407, 451, 702

[56] References Cited

U.S. PATENT DOCUMENTS 4,111,838  9/1978  Schaeffer ........................... 210/656
4,159,966  7/1979  Roberts .............................. 252/430

OTHER PUBLICATIONS

Baczuk et al., J. of Chromatography, vol. 60, (1971), pp. 351–361.

*Primary Examiner*—Benjamin R. Padgett
*Assistant Examiner*—Irwin Gluck
*Attorney, Agent, or Firm*—James R. Hoatson, Jr.; Raymond H. Nelson; William H. Page, II

[57] ABSTRACT

An inorganic oxide impregnated with poly(aminostyrene) whose amino groups are covalently bonded to carboxyl groups of chiral organic hydroxy acids may be used as the solid stationary phase in the chromatographic separation of racemic mixtures.

6 Claims, No Drawings

CHIRAL SUPPORTS FOR RESOLUTION OF RACEMATES

BACKGROUND OF THE INVENTION

Ever since Pasteur discovered the property of optical activity displayed by chiral compounds, the resolution of racemic mixtures into their enantiomeric components has posed a challenge. Substantial progress in separating enantiomeric pairs has been achieved since Pasteur's laborious hand separation of the enantiomeric crystals of racemic sodium ammonium tartrate, yet methods of resolution, and the materials used therefor, remain a formidable obstacle to commercial production of optically active organic substances.

A traditional method of resolution comprises reacting a racemic mixture with a second optically active substance to form a pair of diastereomeric derivatives. Such derivatives generally have different physical properties which permit their separation by conventional means. For example, fractional crystallization often permits substantial separation to afford at least one of the diastereomers in a pure state, or largely so. An appropriate chemical transformation then converts the purified derivative, which was formed initially solely to prepare a diastereomeric pair, into one enantiomer of the originally racemic compound. This traditional method is exemplified by the reaction of naturally occurring optically active alkaloids, for example, brucine, with racemic acids to form diastereomeric salts, with release of an optically active organic acid from a purified diastereomer upon acidification of the latter.

Such traditional methods suffer from many limitations. Generally, only one of the enantiomeric pairs can be obtained, so yields are necessarily less than 50%. The separation of the material so obtained usually is incomplete, leading to materials with enhanced rather than complete optical purity. The optically active materials used to form the diastereomers frequently are expensive and quite toxic—the alkaloids as a class are good examples—and are only partially recoverable. Regeneration of optically active material from its derivative may itself cause racemization of the desired compound, leading to diminution of optical purity. For example, if optically active benzyl alcohols are prepared through their diastereomeric ester derivatives, subsequent acid hydrolysis of the latter to regenerate the alcohol may be accompanied by appreciable racemization.

With the advent of chromatography diverse variations on the basic method of separating diastereomers became possible. These approaches undeniably represent substantial advances in the art, yet fail to surmount the basic need, and associated problems, to prepare diastereomeric derivatives of the desired compound and to transform such derivatives after separation to the optically active compounds of interest.

Chromatographic methods of separation offer advantages of general application, mild conditions which generally preclude chemical or physical transformation, efficiency of recovery and separation which are limited only by the number of theoretical plates employed, and the capability of utilization from a milligram to kilogram scale. Translation from a laboratory to industrial scale has proved feasible, and commercial processes employing chromatographic separation occupy an important position in the arsenal of available industrial methods. For such reasons, methods based on chromatographic separation remain under intensive exploration.

To circumvent the disadvantage of separating diastereomeric derivatives of a compound while retaining the advantages of chromatographic separation, recent advances in the art have employed chiral, optically active compounds in association with the chromatographic support. The theory underlying this approach is that chiral material will have differential weak interactions with enantiomers, for example, hydrogen bonding, or acid-base interactions generally. Such weak interactions lead to reversible formation of entities which we refer to as complexes, and the equilibrium constant characterizing complex formation will differ from each member of the enantiomeric pair. The different equilibrium constants manifest themselves as a differing partition coefficient among the phases in a chromatographic process, leading ultimately to separation of enantiomers.

Thus, enantiomers of some chromium complexes were resolved by chromatography on powdered quartz, a naturally occurring chiral material. Karagounis and Coumolos, *Nature*, 142, 162 (1938). Lactose, another naturally occurring chiral material, was used to separate p-phenylene-bis-iminocamphor. Henderson and Rule, *Nature*, 141, 917 (1938). However, despite this knowledge substantiating theoretical considerations, advances in the art have been tortuous at best.

A major obstacle has been development of a chiral solid phase capable of resolving, at least in principle, a broad class of racemic organic compounds, with a stability which permits repeated usage, and with adequate capacity to make separation feasible on a preparative scale. Gil-Av has made a major contribution toward one kind of solution by gas-liquid phase chromatographic resolution of enantiomers using columns coated with N-trifluoroacetyl derivatives of amino acids, di- and tri-peptides. Gil-Av and Nurok, "Advances in Chromatography", Volume 10, Marcel Dekker (New York), 1974. However, the advances suffer practical limitations originating from the need to have volatile substrates and the inability to scale up methods employed.

Another advance is represented by the work of Baczuk and coworkers, *J. Chromatogr.*, 60, 351 (1971), who covalently bonded an optically active amino acid through a cyanuric acid linkage to a modified dextran support and utilized the resulting material in column chromatography to resolve 3,4-dihydroxyphenylalanine. A different approach is exemplified by polymerization of optically active amides with the resulting polymer used as a solid phase in liquid-solid chromatography. Blaschke and Schwanghart, *Chemische Berichte*, 109, 1967 (1976).

General considerations of the characteristics of a solid phase chiral chromatographic medium, including such factors as structural integrity, flow characteristics, chemical inertness, reusability, capacity, and incorporation into well developed commercial processes, suggest that a desirable material will be comprised of (1) a solid, largely inorganic support, bearing a (2) pendant functional group sufficiently removed from the surface of the support so that it may (3) covalently bond with a suitable site of a chiral molecule while enabling the latter to at least simulate its homogeneous interactions with racemic compounds it encounters.

SUMMARY

An object of this invention is to provide material suitable for use as a solid phase in the chromatographic separation of racemic mixtures. An embodiment of this invention comprises an inorganic oxide, selected from the group consisting of alumina and silica, impregnated with poly(aminostyrene), a substantial portion of whose amino groups are covalently bonded through an amide linkage to a chiral hydroxy acid and derivatives thereof. In a more specific embodiment more than 50% of the amino groups are bonded to the chiral hydroxy acid. In a still more specific embodiment the chiral hydroxy acid is tartaric acid or derivatives thereof where both hydroxyl groups are esterified.

DESCRIPTION OF THE INVENTION

The inventin herein discloses material which may be suitable for use as a solid phase chromatographic medium in the separation of racemic mixtures. Such material is comprised of a core support, a layer of poly(aminostyrene) deposited on the core support, and a chiral organic hydroxy acid covalently bonded to the poly(aminostyrene) via an amide linkage formed, if only conceptually, by reaction of the amino group with the carboxyl group of the organic acid.

The core support of this invention consists of metal oxides, such as silica, alumina, zirconia, thoria, and combinations thereof. Silica and alumina are preferred materials of this invention, and among the aluminas gamma-alumina is especially preferred. However, other core supports such as glass or ceramic materials also may be employed, although not necessarily with equivalent results. It is only necessary that the core support have the ability to be impregnated with poly(aminostyrene) in such a way as to retain the layer of polymeric material deposited thereon.

In this invention the core support is impregnated with poly(aminostyrene). What is meant by impregnation is that there is deposited on the surface, and/or within the pores, of the core support a more or less uniform film of poly(aminostyrene). The poly(aminostyrene) of this invention has a molecular weight from about 10,000 to about 200,000 units. Although it is not necessary to cross link the poly(aminostyrene) so deposited, such cross linking may result in the polymer becoming more firmly attached to the core support, and consequently may be desirable in some circumstances. The poly(aminostyrene) may be deposited per se on the core support, or it may be formed on the core support in situ from a suitable precursor.

A substantial portion of the amino groups of the poly(aminostyrene) is present as an amide, with the carboxyl functionality arising from the chiral organic acid. Generally, at least 30% of the amino groups present are so amidated, with the exact amount depending, inter alia, on the total concentration of amino groups per gram of support, the nature of the chiral organic acid, and the resolution to be performed. The total concentration of chiral hydroxy acids, and derivatives thereof, so bonded may be from about 0.1 to about 1.0, or even higher, milliequivalents per gram of inorganic oxide.

The chiral molecules of this invention are hydroxy acids and their derivatives. A partial, but not exclusive, list of such acids, cited solely for illustrative purposes, include tartaric acid, lactic acid, malic acid, mandelic acid, glyceric acid, 3-phenyl-2-hydroxypropionic acid and ring substituted derivatives thereof, ascorbic acid, and sugar acids such as gluconic and glucaric acids. The use of derivatives of hydroxy acids often confer benefits which are advantageous. Such derivatives are of the hydroxyl group of the hydroxy acid, and ethers and esters are especially important. The ethers may be alkyl, aryl, substituted aryl, or aralkyl ethers, examples of which include methyl, ethyl, propyl, butyl, phenyl, nitrophenyl, dinitrophenyl, benzyl, hydroxybenzyl, nitrobenzyl, dinitrobenzyl, 9-anthryl, 9-anthrylmethyl ethers, etc.

The esters of the hydroxyl group which may be used in this invention may be esters of either aliphatic or aromatic acids. Examples include esters of acetic, propionic, butyric, caproic, 2-chloroacetic, 2-bromoacetic, hydroxyacetic, aminoacetic, benzoic, hydroxybenzoic, nitrobenzoic, dinitrobenzoic, halobenzoic acids, etc.

Specific examples of derivatives which may be used in this invention, which are cited solely for purposes of illustration and should not be construed as a limitation in any manner, include monoacetyl tartaric acid, dibenzoyl tartaric acid, 2-benzyloxysuccinic acid (the benzyl ether of malic acid), 2-nitrophenoxysuccinic acid, 2-chlorobenzoyloxypropionic acid (the chlorobenzoate ester of the hydroxy group of lactic acid), ethyl glycerate, dinitrobenzyl lactate, butyl mandelate, the diamide of malic acid, glyceric acid, N-anthrylamide, etc.

As was mentioned previously, the poly(aminostyrene) impregnated inorganic oxide may be formed in situ, or may be formed by depositing prior-formed poly(aminostyrene) directly on the inorganic oxide. Where the poly(aminostyrene) is formed in situ, the alumina is first impregnated with polystyrene of suitable molecular weight, and subsequently the dried support is nitrated, as for example with fuming nitric acid, to form a poly(nitrostyrene) impregnated inorganic oxide. The nitro groups then can be reduced, using for example a stannous chloride-hydrochloric acid mixture, to amino groups.

In an alternate mode of preparation, the poly(aminostyrene) can be prepared separately from polystyrene, generally via a nitration-reduction sequence. A solution of the poly(aminostyrene) in a suitable solvent is then contacted with the inorganic oxide for a time sufficient to ensure adequate deposition, after which the inorganic oxide is separated, as by filtration, and excess, nonadhering poly(aminostyrene) may be removed by washing with a suitable solvent.

A mixture of the anhydride of the chiral acid and a suitable base, such as a trialkylamine, in a solvent such as tetrahydrofuran is then contacted with the polymer impregnated support at a temperature and for a time sufficient to achieve acylation of the amino group by the anhydride. A temperature from about 40° to about 100° C. for a time from about 1 to about 10 hours generally suffices. Typically about 10% excess anhydride is used based on the amino groups present. Solid is then separated, as by filtration, and washed to remove adhering but not covalently bound organic material.

The examples listed hereunder are cited solely for illustrative purposes. It is to be understood that this invention is not limited thereto.

EXAMPLE I

A saturated solution of polystyrene, molecular weight 22,000, in reagent grade acetone was contacted with about 70 ml. gamma alumina in vacuo for about one-half hour. The solid was collected, air dried, then slowly added to 50 ml. fuming nitric acid, held at 0°–5° C., and stirred at those temperatures for an additional hour. The solid was removed by filtration, thoroughly washed with water until the washings were neutral and air dried. The nitrated polymer impregnated oxide was reduced by addition, to a boiling solution of stannous chloride (50 g) in 50 ml. concentrated hydrochloric acid, and the mixture was maintained at the boiling point for about one-half hour. The solid then was removed by filtration, and washed thoroughly with copious amounts of water. The poly(aminostyrene) impregnated support was then dried prior to subsequent use. Analysis showed 0.40 milliequivalents amine per gram.

Prior to acylation, the poly(aminostyrene) impregnated support (45 g) was washed with dilute base, to generate the free amine, followed by a thorough water wash to remove excess base. A solution of d-(+)-dibenzoyl tartaric anhydride in aqueous 90% tetrahydrofuran containing 10% excess anhydride, based on the amine functionality on the support, and an equivalent amount of triethylamine was contacted with the poly(aminostyrene) support at 50° C. for approximately 5.5 hours and mixed continually by slow rotation. Upon completion of the reaction, the solid was removed by filtration, and the chiral support was washed with water and air dried.

EXAMPLE II

This example differs from that above in that the poly(aminostyrene) was preformed and deposited on the inorganic oxide from a solution of its hydrochloride.

The preformed poly(aminostyrene) was prepared as follows. Polystyrene (22 g) of molecular weight about 22,000 was added slowly to 100 ml of fuming nitric acid maintained at 0°–8° C. The mixture remained at this temperature overnight, then cautiously diluted with a large amount of ice water. Nitrated polystyrene was collected by filtration, washed well with water, then air dried.

Poly(nitrostyrene), 25 g., was added to a boiling mixture of stannous chloride (55 g) in 75 ml concentrated hydrochloric acid. After 30 minutes solid was collected from the cooled solution by filtration and redissolved in boiling water with the aid of hydrochloric acid. The hot solution was filtered, and filtrate was diluted with an equal volume of acetone, then cooled to 4° C. The resulting yellow precipitate of poly(aminostyrene hydrochloride) was collected by filtration.

Typically, 4% solutions of poly(aminostyrene) in 3.6% hydrochloric acid as solvent were utilized. To 100 volumes of such solution were added 75 volumes of inorganic oxide, and the mixture was stirred vigorously for several minutes. The mixture was then placed in a vacuum oven for 1.5 hours, after which liquid was decanted off and the resulting solid was air dried. Prior to coupling with the anhydride, the free amine was generated by addition of 5% sodium hydroxide. Acylation then was conducted as described in Example I.

We claim:

1. A composition for resolution of racemic material comprising an inorganic oxide selected from the group consisting of alumina and silica, impregnated with poly(aminostyrene), a substantial portion of whose amino groups are covalently bonded through an amide linkage to a chiral hydroxy acid or a derivative thereof.

2. The composition of claim 1 wherein the alumina is gamma alumina.

3. The composition of claim 1 wherein at least 30% of the amino groups are covalently bonded through an amide linkage to a chiral hydroxy acid or a derivative thereof.

4. The composition of claim 3 wherein the bonded chiral hydroxy acid or a derivative thereof is present at a concentration from about 0.1 to about 1.0 milliequivalents per gram of inorganic oxide.

5. The composition of claim 3 wherein the chiral organic acid or a derivative thereof is selected from the group consisting of tartaric acid, lactic acid, malic acid, glyceric acid, mandelic acid, ascorbic acid, the sugar acids, 3-phenyl-2-hydroxypropionic acid and nuclear derivatives thereof.

6. The composition of claim 5 wherein the derivatives of said chiral orgaic acids are selected from the group consisting of ethers and esters of the hydroxy group of said acids.

* * * * *